FREE-RUNNING OSCILLATOR

Filed April 22, 1963

INVENTOR
SAUL N. ZILBERFARB

BY Edward M. Farrell
ATTORNEY

United States Patent Office 3,266,508

Patented August 16, 1966

3,266,508

FREE-RUNNING OSCILLATOR

Saul N. Zilberfarb, Philadelphia, Pa., assignor to Sperry Rand Corporation, New York, N.Y., a corporation of Delaware Filed Apr. 22, 1963, Ser. No. 274,742

7 Claims. (Cl. 137—81.5)

The invention relates to a fluid pulse generator and more particularly to a free-running fluid pulse generator.

Since fluid devices, such as fluid amplifiers, have proven themselves to be readily adaptable to digital techniques, data processing equipment has been developed wherein the processing functions are carried out in conformance with fluid principles. Whereas electrical digital processing equipment utilizes electrical pulse generators, fluid operated equipment requires the availability of fluid pulse sources.

Electrical pulse generators may be of the free-running type, that is they operate without external synchronizing pulses. They operate at their so-called free-running frequency, that is the frequency at which a normally synchronized oscillator operates in the absence of a synchronizing signal.

It is an object of the invention to provide a free-running pulse generator operating on fluid principles to produce fluid pulses.

It is a further object of the invention to provide an improved fluid pulse generator adapted to produce fluid pulses of variable time duration.

It is a still further object of the invention to produce an improved fluid pulse generator adapted to produce fluid pulses at a variable repetition rate.

According to the invention, means are provided to produce a fluid power stream representing an output pulse, which oscillates automatically between two unstable states at a frequency dependent on device constants. Means may be provided to control the time between two oscillations, i.e. the frequency of the device.

Figure 1A:
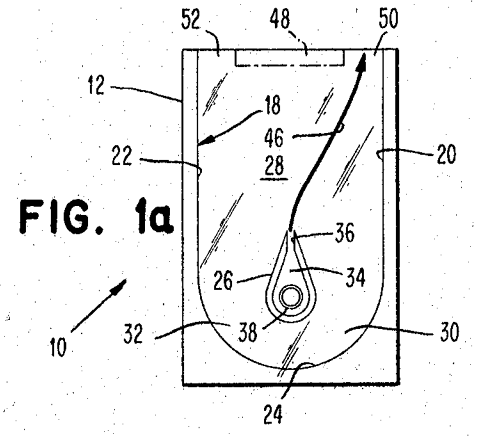
Figure 1B:
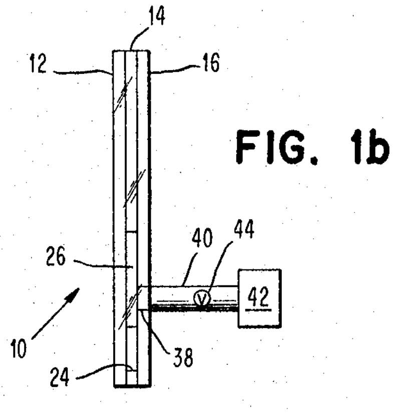
Figure 2A:
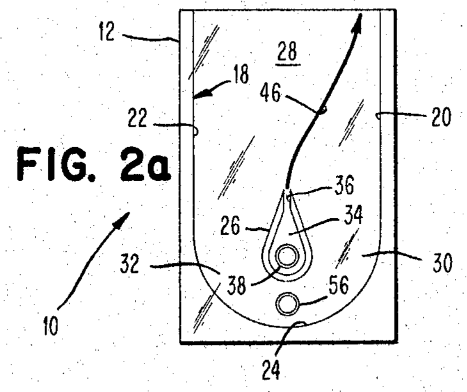
Figure 2B:
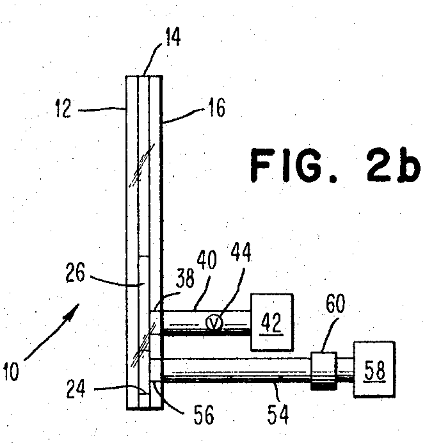
Figure 3:
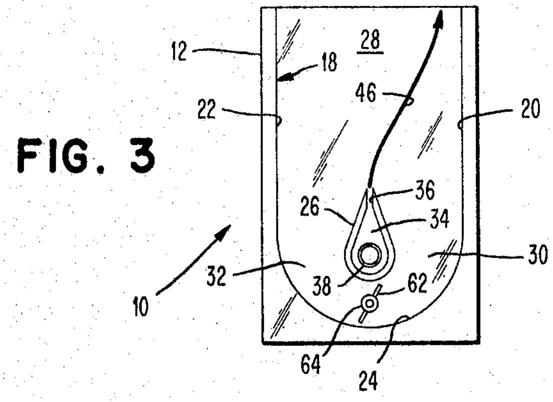

Further objects of the invention will become apparent upon reading the following specification, together with the accompanying drawing, in which:

FIG. 1*a* illustrates a plan view of the device according to the invention,

FIG. 1*b* illustrates a side view of the device illustrated by FIG. 1*a*,

FIG. 2*a* illustrates a modification of the device according to the invention,

FIG. 2*b* illustrates a side view of the device of FIG. 2*a*, and,

FIG. 3 illustrates another modification of the device illustrated by FIGS. 1*a* and 1*b*.

Referring to FIGS. 1 and 1*a* of the drawing, a fluid operated device 10 according to the invention is formed by three laminae 12, 14 and 16. Lamina 14 is positioned between laminae 12 and 16, and is tightly sealed between them by suitable means, such as screws or cement (not illustrated). The laminae 12, 14 and 16 may be of metallic, plastic or other suitable material. For purposes of illustration, laminae 12, 14 and 16 are shown as being of a clear plastic material.

The lamina 14 has a cut-out section, obtained, for example, by means of a cutting or stamping operation. The cutout section forms, with the top and bottom laminae 12 and 16, a chamber 18 having substantially parallel walls 20 and 22 and a substantially semi-circular bottom portion 24. A dam 26 within chamber 18 extends between the top and bottom laminae 12 and 16. The dam defines within the chamber 18 three main operational areas, namely the switching area 28, and the control areas 30 and 32.

The dam 26 comprises a fluid supply inlet 34. Fluid supply inlet 34 forms a constricted supply orifice 36, communicating with the chamber 18. The term orifice as used herein includes an orifice having parallel, converging or diverging walls or any conventional shape. The supply inlet 34 communicates with a bore 38 in lamina 16. Bore 38 may be internally threaded to receive a tube 40 which may be externally threaded. The end of tube 40, extending from lamina 16 is connected with a source 42 of fluid under pressure. The fluid under pressure may be a gas or air, or water or other liquid. Fluid flow regulating devices such as a value 44, may be used in conjunction with the fluid source 42, so as to supply a constant flow of fluid at a desired pressure. Such fluid regulating devices are of conventional construction.

Fluid flowing from source 42 and entering the device through supply inlet 34 is, for the purpose of explanation, assumed to be at a certain pressure above atmospheric pressure. As the stream of fluid is reduced in cross-sectional area in the orifice 36, its velocity increases. The fluid stream of reduced cross-sectional area, indicated by arrow 46, is called the power stream of the device.

Although the power stream issues from orifice 36 in an axial direction, it immediately switches toward either wall 20 or 22 of chamber 18. This is a result of the viscous drag which the power stream exerts on the ambient particles in the chamber. A part of these particles is entrained by the power stream so that a certain pumping action results in the region 30 and 32 between the boundaries of the power stream and the walls 20 and 22. It will be understood that this pumping action is not exactly of equal intensity on both sides of the power stream, so that the pressure in one region will decrease at a higher rate than in the other. As soon as the pressure differential between the two regions is sufficiently high, the power stream will move to the region of lowest pressure. The pumping action is now intensified in this region and the power stream is said to lock onto the pertaining wall.

Assume for the purpose of explanation that power stream 46 locks onto wall 20. As soon as the power stream locks onto this wall, fluid from the surrounding atmosphere will flow along wall 22, around the backside of dam 26 and into the low pressure area 30. The in-flowing air, in addition to neutralizing the original pressure differential between both sides of the power stream, upsets the conditions of stability in the control area 30 and, as a result, the power stream 46 detaches from wall 20 and switches over and locks onto wall 22. As soon as the power stream is locked to wall 22, the same process as explained above is repeated and the power stream now switches back to wall 20 thereby completing one cycle of the operation of the device, i.e. one oscillation of the power stream.

It will be understood that the time between two oscillations of the power stream, i..e the oscillation frequency of the device, is determined by the time needed for the air flowing into a control region to neutralize and finally overcome the partial vacuum created by the power stream itself in that control region.

Experiments have shown that, for a given design and for given device dimensions, the oscillation frequency of the device is determined by the extent to which a dam 48 extending between laminae 12 and 16, closes off the end of chamber 18. This may be explained by realizing that the dam defines two inlet openings 50 and 52 which influence the quantity of air that may enter the device per unit of time.

It will be understood that the smaller the inlet openings 50 and 52 are, the longer it will take for the inflowing air to neutralize the subpressure in a control region, i.e., the lower the frequency of the device.

Dam 48 need not define two inlet openings 50 and 52 of equal cross sections. The openings may be of different dimensions so that an oscillator producing a sequence of two output pulses of different lengths is obtained. The inlet openings may be adjustable in dimensions so that the length of the output pulses may be controlled.

The oscillation frequency of a given device may also be controlled by controlling the amount of fluid per unit time that enters the control area by supplying fluid in addition to the fluid flowing into a control region, or by removing a portion of the in-flowing fluid. FIGS. 2*a* and 2*b* show means to realize this type of frequency control in a device according to the invention. Like parts are indicated by the same reference numerals as in FIGS. 1*a* and 1*b*.

It will be noted that in FIGS. 2*a* and 2*b* a tube 54 is secured in a bore 56 of lamina 16. Bore 56 may be internally threaded to receive the tube 54 which may be externally threaded. The tube 54 ends in the bottom portion 24 of the chamber 18. The end of tube 54, extending from lamina 16, is connected with a source 58 of control fluid under pressure. The control fluid under pressure may be a gas or air, or water or other liquid generally a fluid of the same kind as the fluid for the power stream. Reference numeral 60 indicates any means, such as a pressure transducer, which controls the flow of control fluid from source 58 through tube 56 to the device.

If a fluid control pulse is supplied from source 58, the fluid representing the control pulse is added to the fluid entering the device along either wall 20 or 22 and thereby decreases the time needed for pressure equalization in a control region 30 or 32 respectively. Thus, the duration of the application of control fluid to the device as determined by transducer 60 determines the increase in oscillation frequency of the device.

It will be understood that transducer 60 may control the supply of pulses of negative pressure value if the source 58 of control fluid is a source of negative pressure. In this case the application of control pulses by transducer 60 effects the removal of inflowing fluid and thereby increases the time needed for pressure equalization in a control region. Thus the oscillation frequency of the device is decreased.

It may be desired that the device have memory properties, i.e., that the power stream remains locked to either wall of chamber 18. In this case the pressure equalization process, repeatedly described above, must be prevented. Such may be obtained by providing, for example, a baffle 62 in the region 24, as illustrated by FIG. 3. Again, like parts are indicated by the same reference numeral as in the figures discussed above. The baffle is mounted for rotation about a shaft 64. Shaft 64 may extend through lamina 16 so that it may be rotated from the outside of the device. In the position wherein the baffle 62 closes, or sufficiently closes, the passageway between dam 26 and the bottom portion 24, no air can flow into a control region and accordingly no pressure equalization can take place in that region.

It will be understood that modifications and variations may be effected without departing from the scope of the present invention. For example, it will be understood that, although the devices illustrated and described are basically of planar construction, a device according to the invention may have a third dimension of substantial magnitude.

The embodiments of the invention in which an exclusive property or privilege is claimed are defined as follows:

1. A fluid device comprising a chamber having an outlet, said chamber being defined by two substantially parallel side walls and a semi-circular wall forming a continuous planar surface with said two walls opposite from said outlet, means within said chamber for producing a stream of fluid toward said outlet, said stream of fluid normally locked to one or the other of said side walls said means being spaced from said side walls and said semi-circular wall establishing a fluid path from one side of said stream of fluid around said means to the other side of said stream of fluid to permit fluid flow from said outlet around said means to the side of said stream of fluid locked to a sidewall.

2. The invention as set forth in claim 1 wherein said means are removed a substantially equal distance from said side walls.

3. The invention as set forth in claim 1 wherein said third wall is substantially semicircular.

4. A fluid device comprising a first, a second and a third lamina, said second lamina being fluid tightly sealed between said first and third lamina, said second lamina having a cut-out configuration, said cut-out configuration defining a chamber between said first and third lamina, said chamber including an outlet, two side walls and an end wall opposite said outlet, a dam within said chamber extending between said first and third lamina, said dam including a fluid supply inlet and an orifice in fluid communication with said chamber, said orifice being disposed to direct a fluid stream toward said outlet, said fluid stream normally attaching to one or the other of said side walls said dam being disposed within said chamber to establish a fluid path between said dam and said end wall whereby fluid flow from said outlet around said dam causes said fluid stream to oscillate between said side walls as it flows through said outlet.

5. The invention as set forth in claim 4 wherein said chamber includes therein control means for controlling the frequency with which said stream of fluid oscillates.

6. The invention as set forth in claim 5 wherein said control means comprises means disposed in said fluid path to provide fluid of a positive or negative pressure to said chamber.

7. The invention as set forth in claim 5 wherein said control means comprises means to vary the size of said fluid path.

References Cited by the Examiner

UNITED STATES PATENTS

| | | | |
|---|---|---|---|
| 3,016,063 | 1/1962 | Hausmann | 137—81.5 |
| 3,016,066 | 1/1962 | Warren | 137—81.5 |
| 3,093,306 | 6/1963 | Warren | 137—81.5 |
| 3,098,504 | 7/1963 | Joesting | 137—624.14 |
| 3,158,166 | 11/1964 | Warren | 137—81.5 |

M. CARY NELSON, *Primary Examiner.*

LAVERNE D. GEIGER, S. SCOTT, *Assistant Examiners.*